Patented Nov. 6, 1951

2,574,313

UNITED STATES PATENT OFFICE 2,574,313

WIRE COATING COMPOSITIONS

Robert J. Anderson, Springfield, Mass., assignor to Monsanto Chemical Company, St. Louis, Mo., a corporation of Delaware No Drawing. Application September 23, 1948, Serial No. 50,873

6 Claims. (Cl. 260—19)

This invention relates to wire coating compositions and to wire carrying such coatings. More particularly, the invention relates to modified polyvinyl formal wire coating compositions.

Polyvinyl formal has been used alone and admixed with phenol aldehyde resins for coating wire to insulate the wire electrically and against the deteriorating effects of atmospheric conditions. The best of these compositions have been used extensively and successfully when production methods have been carefully and rigidly controlled. Even with excellent control, the coatings were frequently cloudy, rough, and, in some cases, almost electrically conducting. Furthermore, they have been applied from solution in organic solvents, the nature and quality of which were restricted by the solubility properties of the compositions. For example, when coal tar naphtha was used, the quality of the naphtha had to be carefully controlled to prevent occurrence of cloudy solutions and films.

An object of this invention is to provide a new wire coating composition.

A further object is to modify polyvinyl formal coating compositions.

These and other objects are attained by modifying polyvinyl formal resins with oil-modified phenolic resins.

The following examples are given in illustration and are not intended as limitations on the scope of this invention. Where parts are mentioned, they are parts by weight.

Example I 100 parts of cresylic acid, 20 parts of oiticica oil, 90 parts of formalin (37% formaldehyde), 4 parts of 28% ammonium hydroxide, and 1 part of phenyl trimethyl ammonium hydroxide were mixed in a kettle and heated at reflux temperature under atmospheric pressure for about 5 hours. The reaction product was then dehydrated under vacuum to obtain a soft lump resin which was soluble in cresylic acid. Solutions of the resin in cresylic acid showed exceptionally high tolerance for toluol and other aromatic solvents.

Example II 50 parts of the lump resin obtained in Example I were mixed with 100 parts of a polyvinyl formal resin in a Banbury mixer, care being taken to prevent the advancement of the phenolic resin to the insoluble stage. The resulting composition could be extruded over wire and cured at 300° F. to 600° F. to provide a smooth, flexible, moisture-resistant coating having excellent electrical insulating properties.

The compositions of this invention may be mixed dry and extruded onto wire as shown in Example II, or they may be dissolved in suitable solvents and then applied to wire by conventional coating means. The oil-modified phenolic resin and the polyvinyl formal resin may be blended in the dry state and the blend dissolved in suitable solvents, or each resin may be dissolved separately followed by mixing the two solutions together. In a preferred method, the oil-modified phenolic lump resin is dissolved in cresylic acid, furfural, or a mixture thereof. The polyvinyl formal is dispersed separately in an aromatic solvent such as toluol, coal tar naphtha, xylol, or mixtures thereof. The two solutions are then brought together and intimately mixed. Following this procedure, it was found that the coating solutions were not cloudy and did not develop cloudiness on long standing. Furthermore, the cured coatings prepared therefrom were substantially clear, smooth, and flexible and had excellent electrical insulating properties.

After applying the compositions of this invention to wire, it is necessary to cure them to an insoluble, infusible state by heating the coated wire at temperatures of from 300° F. to 600° F. or above. Since the coatings used are generally quite thin, it is possible to effect the cure in a relatively short time, such as, by passing the wire through a heated oven or under a bank of infra-red lamps. Where volatile solvents are used, it is preferred to remove them at lower temperatures, i. e., from 100° F. to 300° F., before increasing the temperature to effect the cure.

The compositions of this invention comprise mixtures of from 40 to 150 parts of drying oil-modified phenolic resin with 100 parts of a polyvinyl formal resin. The phenolic resins are prepared by reacting 1 mol of phenol with from 0.75 to 2 mols of formaldehyde and from 5 to 50 parts, based on 100 parts of the phenol, of a drying oil under alkaline conditions, followed by dehydration to obtain a solid, fusible, lump resin which is soluble in cresylic acid, furfural, etc., and has high tolerance for coal tar naphtha, toluol, xylol, benzol, and other aromatic solvents.

The phenol used may be monohydric or polyhydric and may be substituted by alkyl groups such as the methyl, ethyl, butyl, etc., groups. Among the phenols which may be used are phenol, cresols, the xylenols, resorcinol, p-t-butyl phenol, etc.

The formaldehyde is preferably used as the commercial formalin which is an aqueous solution containing substantially 37% formaldehyde. However, it is possible to use the polymeric forms of formaldehyde such as paraformaldehyde. In most instances, the amount of formaldehyde used will vary between 0.75 and 2 mols per mol of phenolic component. However, it may be desirable to use an excess of formaldehyde and then remove the excess during the dehydration step.

Drying oils which may be used include oiticica oil, tung oil, linseed oil, Perilla oil, poppy-seed oil, sunflower seed oil, etc. They may be used in proportions which vary between 5 and 50 parts by weight based on 100 parts of the phenolic component.

The preparation of the drying oil-modified phenolic resin is carried out under alkaline conditions at reflux temperature and atmospheric pressure. Any of the well-known alkaline catalysts may be used, but for electrical insulating purposes, it is preferred to use ammonium hydroxide with or without a small amount of a strongly basic quaternary ammonium compound, such as the phenyl trimethyl ammonium hydroxide shown in Example I.

The polyvinyl formal used is obtained by reacting polyvinyl alcohol or a partially hydrolyzed polyvinyl ester with formaldehyde. The formals contain a certain number of hydroxyl groups which are unreacted and a certain number of ester groups which were not removed in the hydrolysis step. Thus, the polyvinyl formal resins may contain on a weight basis, 0–35% ester groups calculated as polyvinyl ester, 3–15% hydroxyl groups calculated as polyvinyl alcohol and the balance substantially formaldehyde acetal. Preferably, the ester groups are acetate groups.

The coatings of this invention are smooth, glossy, resistant to moisture, and have good electrical insulating properties. When used in solution form, no cloudiness develops in the solution and cloudy films are not obtained. This property is due to the excellent solubility characteristics of the compositions which make it possible to use commercial grade solvents having widely different solvent properties and which obviate the necessity for strict control of the process.

Conventional additives such as fillers, pigment dyes, lubricants, etc., may be added to the compositions of this invention either when mixed dry or when used in solution form.

It is obvious that many variations may be made in the products of this invention without departing from the spirit and scope thereof as defined in the appended claims.

What is claimed is:
1. A wire coating composition consisting of 100 parts of a polyvinyl formal resin and from 40 to 150 parts of a soluble, fusible, heat-hardenable reaction product of 1 mol of a phenol with from 0.75 to 2 mols of formaldehyde and from 5 to 50 parts, based on 100 parts of the phenol, of a drying oil.

2. A wire coating composition as in claim 1 wherein the drying oil is oiticica oil.

3. A wire coating composition consisting of 100 parts of a polyvinyl formal resin and 50 parts of a soluble, fusible, heat-hardenable reaction product of 1 mol of a phenol with from 0.75 to 2 mols of formaldehyde and 20 parts of oiticica oil per 100 parts of the phenol.

4. A wire carrying an insulating coating consisting of 100 parts of a polyvinyl formal resin and from 40 to 150 parts of a soluble, fusible, heat-hardenable reaction product of 1 mol of a phenol with from 0.75 to 2 mols of formaldehyde and from 5 to 50 parts of a drying oil per 100 parts of phenol, said coating having been heat-cured to an insoluble, infusible state on the wire.

5. A wire carrying an insulating coating as in claim 4 wherein the drying oil is oiticica oil.

6. A wire carrying an insulating coating consisting of 100 parts of a polyvinyl formal resin and 50 parts of a soluble, fusible, heat-hardenable reaction product of 1 mol of a phenol with from 0.75 to 2 mols of formaldehyde and 20 parts of oiticica oil per 100 parts of phenol, said coating having been heat-cured to an insoluble, infusible state on the wire.

ROBERT J. ANDERSON.

REFERENCES CITED

The following references are of record in the file of this patent:

UNITED STATES PATENTS

| Number | Name | Date |
|---|---|---|
| 2,079,210 | Honel | May 4, 1937 |
| 2,312,431 | Meharg et al. | Mar. 2, 1943 |
| 2,433,098 | Debacher | Dec. 23, 1947 |